(12) United States Patent
Niemela

(10) Patent No.: US 11,265,335 B2
(45) Date of Patent: Mar. 1, 2022

(54) METHOD FOR THREAT CONTROL IN A COMPUTER NETWORK SECURITY SYSTEM

(71) Applicant: F-Secure Corporation, Helsinki (FI)

(72) Inventor: Jarno Niemela, Kirkkonummi (FI)

(73) Assignee: F-Secure Corporation, Helsinki (FI)

(*) Notice: Subject to any disclaimer, the term of this patent is extended or adjusted under 35 U.S.C. 154(b) by 331 days.

(21) Appl. No.: 16/452,748

(22) Filed: Jun. 26, 2019

(65) Prior Publication Data

US 2020/0007560 A1 Jan. 2, 2020

(30) Foreign Application Priority Data

Jun. 29, 2018 (GB) .................................... 1810705

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
CPC ............. H04L 63/1416; H04L 63/1425; H04L 63/1441; G06N 20/00; G06N 7/02; G06N 3/08; G06N 5/003
USPC ......................................................... 726/24
See application file for complete search history.

(56) References Cited

U.S. PATENT DOCUMENTS

| | | | |
|---|---|---|---|
| 9,027,120 B1* | 5/2015 | Tidwell ............... | H04L 41/0631 726/22 |
| 9,363,280 B1* | 6/2016 | Rivlin ................. | H04L 63/1433 |
| 9,654,485 B1* | 5/2017 | Neumann ........... | H04L 63/1441 |
| 9,800,605 B2* | 10/2017 | Baikalov ............. | H04L 63/1408 |
| 10,027,689 B1* | 7/2018 | Rathor .................... | H04L 67/10 |
| 2017/0063905 A1* | 3/2017 | Muddu .................... | H04L 41/22 |
| 2017/0272452 A1* | 9/2017 | Kraemer ............. | H04L 63/1416 |
| 2017/0324757 A1* | 11/2017 | Al-Shaer ............. | H04L 63/1433 |
| 2018/0004948 A1* | 1/2018 | Martin .................. | G06F 21/552 |
| 2018/0063182 A1* | 3/2018 | Jones .................. | H04L 63/1433 |
| 2018/0068119 A1* | 3/2018 | Mitelman ............. | G06F 21/552 |
| 2018/0278650 A1* | 9/2018 | Ray ......................... | H04L 63/20 |

FOREIGN PATENT DOCUMENTS

| | | | |
|---|---|---|---|
| WO | WO 2015/073053 A1 | 5/2015 | |
| WO | WO 2016/123528 A1 | 8/2016 | |

* cited by examiner

*Primary Examiner* — Badri Narayanan Champakesan
(74) *Attorney, Agent, or Firm* — Harrington & Smith

(57) ABSTRACT

A method comprising: monitoring events collected from a plurality of network nodes; detecting a first suspicious event among the monitored events by a detection mechanism; monitoring the behaviour of the first suspicious event and any related events; in case the monitored first suspicious event and/or a related event is detected to perform an activity triggering an IOC (indicator of compromise, generating a new IOC; monitoring new events when the activity ends; comparing the behaviour of the new events with the behaviour of the generated IOC; in case a matching behaviour is found, merging the new event with the first suspicious event and/or related events related to the generated IOC; and generating a security related decision on the basis of the IOC.

9 Claims, 2 Drawing Sheets

METHOD FOR THREAT CONTROL IN A COMPUTER NETWORK SECURITY SYSTEM

TECHNICAL FIELD

The present invention relates to a method of threat control in a computer network security system and to a server in a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond. The growth of EDR has been made possible in part by the emergence of machine learning, big data and cloud computing.

EDR or other corresponding systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

Attackers are constantly trying to develop ways of evading the detection sensors used in these computer network security systems. One or the simplest and most commonly used technique is a so-called "low and slow attack" where the attacker does offensive actions very rarely and relies on operating system noise to mask the attacker and making it difficult to detect the ongoing attack.

Typical example of a low and slow attack tactic is to create a specific persistence hook into some part of the computer system that is reliably executed often enough for the needs of the attacker. An example of such an attack is, for example, a default template in a word processor application that contains a whitelisted macro payload, a registry launch point detour for some unimportant service or other minor change that is difficult to notice by a security system. The backdoor of the attacker is then always launched as a new process and thus is very difficult to collect all the actions of the attacker over a longer period of time to form situational awareness.

Traditionally attackers may be tracked by creating process trees where a process and it's child processes are tracked. However, since low and slow attacks persist over reboots and other system shutdowns, the process trees break down and cannot be used to track the attacker. There is a need for an improved computer network security system that is able to deal with low and slow type of attacks or any other attacks that are difficult to detect with traditional methods.

SUMMARY

According to a first aspect of the invention there is provided a method in a computer network security system as specified in claim 1.

According to a second aspect of the invention, there is provided a server as specified in claim 7.

According to a third aspect of the invention, there is provided a computer program product comprising a computer storage medium having computer code stored thereon, which when executed on a computer system, causes the system to operate as a server according to the above second aspect of the invention.

DETAILED DESCRIPTION

Figure 1:
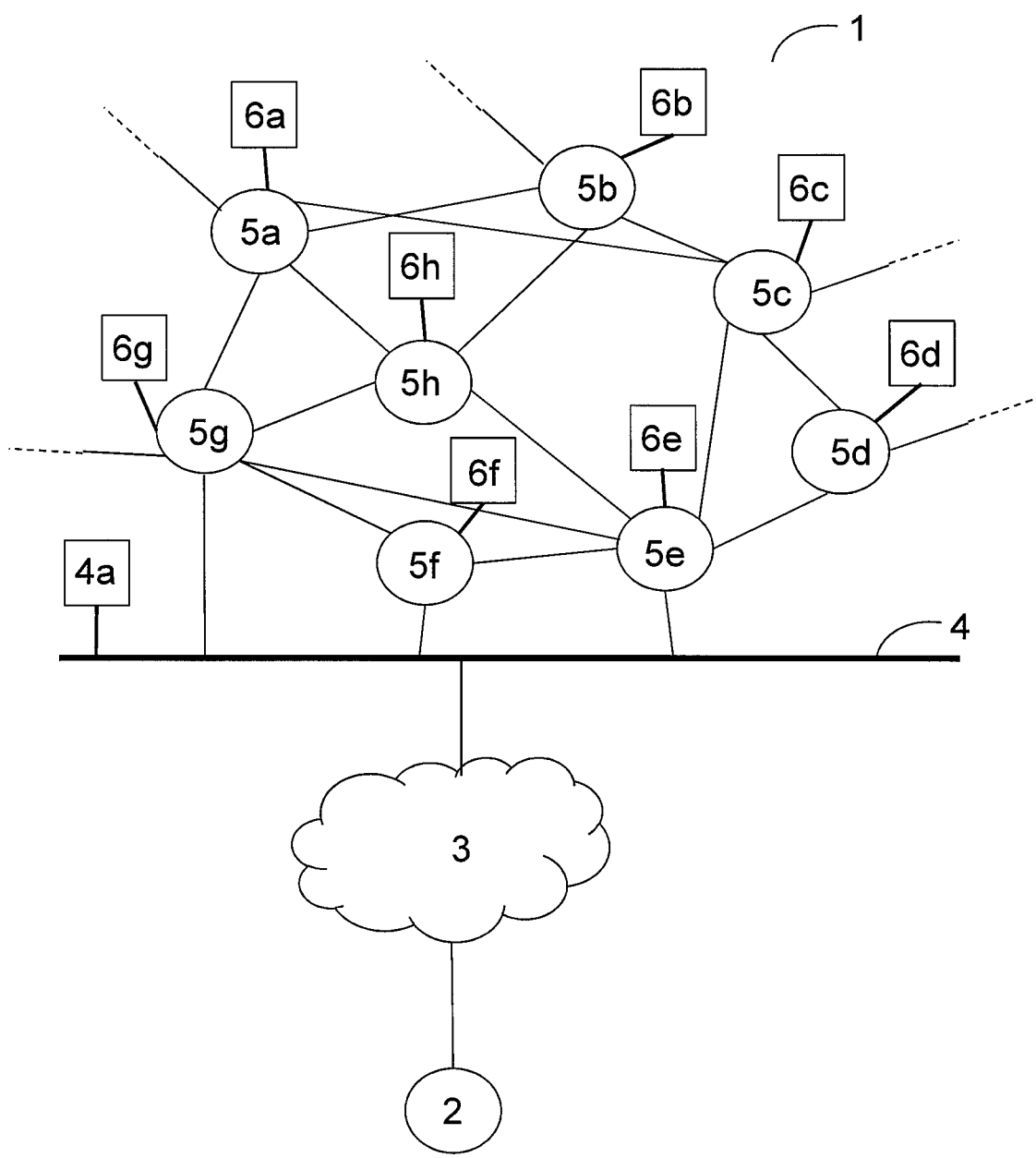
FIG. 1 illustrates schematically a network architecture.

FIG. 1 illustrates schematically a part of a first computer network 1 into which a computer system, for example an EDR system, has been installed. Also any other computer system that is able to implement the embodiments of the invention can be used instead or in addition to the EDR system used in this example. The first computer network is connected to a security backend/server 2 through the cloud 3. The backend/server 2 forms a node on a second computer network relative to the first computer network. The second computer network is managed by an EDR system provider and may be separated from the cloud 3 by a gateway or other interface (not shown) or other network elements appropriate for the backend 2. The first computer network 1 may also be separated from the cloud 3 by a gateway 4 or other interface. Other network structures are also envisaged.

The first computer network 1 is formed of a plurality of interconnected nodes 5a-5h, each representing an element in the computer network 1 such as a computer, smartphone, tablet, laptop, or other piece of network enabled hardware. Each node 5a-5h shown in the computer network also represents an EDR endpoint onto which a data collector (or "sensor") 6a-6h has been installed. Data collectors may also be installed on any other element of the computer network, such as on the gateway or other interface. A data collector 4a has been installed on the gateway 4 in FIG. 1. The data collectors, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

The data collected from the data collectors 6a-6h may be stored in a database for further use. Any kind of behaviour profiles/representations of behaviours of applications/services/processes may be constructed at the nodes 5a-5h by a security application, at the backend/server 2, and/or at a second server and be stored in the database. The nodes 5a-5h and the server 2 typically comprise a hard drive, a processor, and RAM.

It is envisaged that any type of data which can assist in detecting and monitoring a security breach may be collected by the data collectors 6a-6h, 4a during their lifecycle and that the types of data which are observed and collected may be set according to rules defined by the EDR system provider upon installation of the EDR system or in response to instructions from the EDR backend 2. For example, the data collectors 6a-6h, 4a may collect data about the behaviour of programs running on an EDR endpoint and can observe when new programs are started. Where suitable resources are available, the collected data may be stored permanently or temporarily by the data collectors 6a-6h, 4a at their respective nodes or at a suitable storage location on the first computer network 1 (not shown).

The data collectors 6a-6h, 4a may also perform some simple, preliminary processing steps on the collected data but this is limited by the computing and network resources available at each node 5a-5h or gateway 4. One of the advantages of the data collectors 6a-6h, 4a is that they are configured to have a small footprint so that they do not disrupt normal functioning of the first computer network 1 through over use of bandwidth or computing power. As such, if the data collectors 6a-6h, 4a perform simple, preliminary processing steps on the collected data themselves, it should not disrupt normal functioning of the first computer network 1.

The server 2 comprises one or more processors configured to at least: monitor events collected from a plurality of network nodes; detect a first suspicious event among the monitored events by a detection mechanism; monitor the behavior of the first suspicious event and any related events; in case the monitored first suspicious event and/or a related event is detected to perform an activity triggering an incident of compromise (IOC), generate a new IOC; monitor new events when the activity ends; compare the behavior of the new events with the behavior of the generated IOC; in case a matching behavior is found, merge the new event with the first suspicious event and/or related events related to the generated IOC; and generate a security related decision on the basis of the IOC.

The data collectors 6a-6h, 4a are set up such that they send information such as the data they have collected or send and receive instructions to/from the EDR backend 2 through the cloud 3. This allows the EDR system provider to remotely manage the EDR system without having to maintain a constant human presence at the organisation which administers the first computer network 1.

Figure 2:
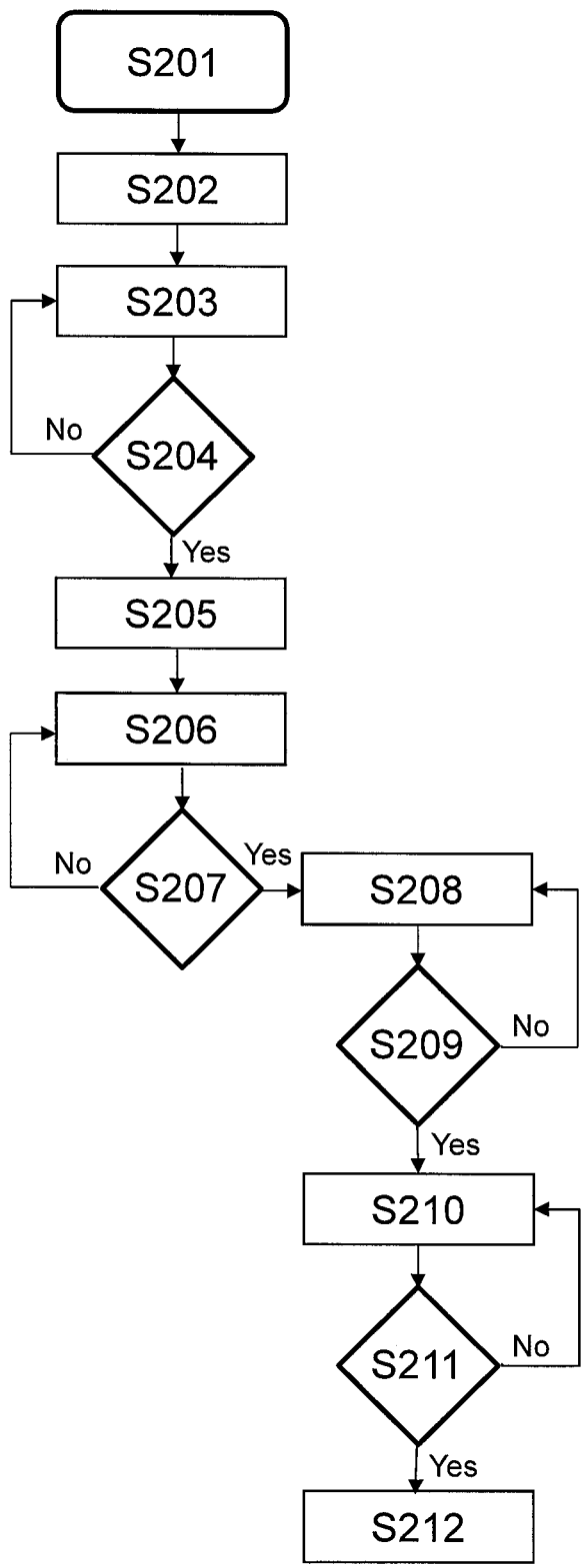
FIG. 2 is a flow diagram illustrating a method according to an embodiment.

FIG. 2 is a flow diagram illustrating a method according to an embodiment.

In S201, events collected from a plurality of network nodes are monitored. Data is collected from the plurality of network nodes (5a-5h) from various kinds of endpoint sensors. The collected data blocks are here referred to as events. In an embodiment, monitoring the behaviour of the first suspicious event and any related events comprises monitoring the behaviour of a computer process and any child processes thereof.

In S202, a first suspicious event among the monitored events is detected by a detection mechanism. In an embodiment, the detection mechanisms used to detect the suspicious event comprises using at least one of: a machine learning models, a scanning engine, a heuristic rule, a statistical anomaly detection, fuzzy logic based models, any predetermined rules.

In S203, the behaviour of the first suspicious event and any related events is monitored.

In S204, in case the monitored first suspicious event and/or a related event is detected to perform an activity triggering an indicator of compromise (IOC), then S205 will be entered. Otherwise, the behaviour of the suspicious event/related events is continued to being monitored. The activity types triggering the IOC may include activity types that can be used for persistence, for example, creating registry launchpoints, files in unusual locations or with unusual name, communication to same unknown IP or domain.

In S205, a new IOC is generated. For example, the behaviour of the process can be compared with the baseline behaviour of that process to determine whether a new IOC is required to be generated. Information of the generated new IOC is recorded to an IOC database. Basically, when a suspicious process is detected to do something that can be used for IOC, such as persistence or command and control (C&C) communication, then this activity/event is used when generating a new IOC. In practise, a new IOC is synthesized on the basis of the behaviour of the suspicious process. The action that is stored as an IOC is not what the process under monitoring is doing but it is the result of that action after an event, such as a reboot, running of a process etc., has happened.

In an embodiment, the IOC may be derived by synthesizing the behaviour based on the detected persistence or C&C action done by the suspicious process. For example, in case the action done by the suspicious process is to create a registry launchpoint, an IOC may be synthesized that tracks process execution events matching the process name and parameters and the parent process that can be derived from said launchpoint.

This is done because merely tracking the creation of a launchpoint (as in traditional methods using IOCs) would only enable detecting the attacker doing identical operation in another compromised system. However, the attackers nowadays use unique persistence methods to avoid being detected by traditional IOCs. The same applies to the use of a powershell profile file as a persistence: in an embodiment, the IOC is not modifying the profile file but the IOC is powershell being launched in such a way that it reads and applies the settings from a particular profile.

In S206, the activity is continued being monitored until when in S207 the activity is detected to end, then S208 is entered where new events are being monitored. The monitoring of new event takes place at any point in time after the new IOC has been generated. In an embodiment, the monitoring of new events takes place after reboot of a computer system related to the network node that is being monitored or after other event inducing breaking of a process group identifier chain related to the first suspicious event/related events that is being monitored. However, some persistence methods do not require the computer system to be rebooted but the attacker simply kills his process and relies on persistence to get restarted again at a later time, then performs one action, kills his own process and waits again.

In S209, in case new events are detected, S210 is entered where the behaviour of the new events is compared with the behaviour of the generated IOC. The behaviour of the new event is compared with the behaviours stored in the IOC database of previously generated IOCs. The comparison may be performed against automatically generated database, which contains IOCs that are machine defined without any human interaction.

In S211, in case a matching behaviour is found, S212 is entered where the new event is merged with the first suspicious event and/or related events related to the generated IOC and a security related decision is generated on the basis of the IOC.

An analysis component may be used for generating the security related decision on the basis of the IOC and it may use any rules, heuristics, machine learning models etc. to analyse the facts related to the IOC in order to find appropriate decisions and recommendations (detections) that positively impact state of the protected IT infrastructures.

If, based on the results from the events analysis component, a sign of a breach is detected, further actions may be taken such as taking immediate action by changing the settings of the network nodes in order to ensure an attacker is stopped and any traces of their moves is not destroyed. Changing the settings may include, for example, one or more nodes (which may be computers or other devices)

being prevented from being switched off in order to preserve information in RAM, a firewall may be switched on at one or more nodes to cut off the attacker immediately, users of the one or more nodes may be warned that a breach has been detected and that their workstation is under investigation, and/or a system update or software patch may be sent from the EDR backend 2 to the nodes in response to detecting a sign of a breach. It is envisaged that one or more of these actions may be initiated automatically by the above-described algorithms. For example, using the above described methods, data has been collected and sent from the nodes in the computer network 1 to the EDR backend 2. The analysis algorithm has determined that a sign of a breach was detected. As soon as the algorithm makes the determination that a sign of a breach was detected, it may generate and issue a command to the related network nodes without human intervention to automatically initiate one or more of the above-described actions at the nodes. By doing this, a breach can be stopped and/or the damage minimised automatically at very high speeds and without human intervention.

It is envisaged that the action of automatically updating system software or sending software patches in response to detecting a sign of a breach will be particularly effective for corporate computer networks whose administrators apply updates and patches only in bulk at infrequent intervals. The method allows such administrators to continue their existing policies without disruption but gives the EDR system an autonomous, automatic override to apply updates and patches in emergency situations without human intervention. For example if a breach occurs at night and the administrator cannot be contacted, the EDR system automatically performs the necessary actions. By the time the administrator is contacted again, the computers on the network have been safely updated and the spread of the attack minimised. Attacks using zero-day exploits in particular can be stopped in their tracks by such a method.

The above-described methods contrasts with existing security products (both EPPs and EDR systems) where most of the data collection, processing, and analysing procedures are manual such that it would not be possible to implement automatic response actions at equally high speeds and accuracy. This technical advantage is particularly realised over traditional systems which are based on human instinct and experience of security teams, intelligent guessing, and traditional statistics. Whilst such traditional systems are implemented using computers (given the nature of the technical field of the invention), they still ultimately rely on human decision making. As such, the present invention is more than merely automation of traditional techniques and it does not pre-empt the traditional, manual systems described above.

The code required to implement data collectors ("sensors") may be based on Google™ GRR ("rapid response"), Facebook™ osquery, or can be built from scratch. It is envisaged that whatever code is used, it should at least be capable of performing the commands of: get file hashes on demand, download files from specified directories, dump network traffic, connections and processes. It must also be able to collect different types of data not normally associated with security systems but which can still be useful in EDR systems.

Generally, the proposed approach introduces number of improvements to conventional solutions. Such improvements comprise, for example, enabling using behavioural anomaly data of the attack to create automatic IOCs and then using the IOCs to maintain indicator context. It is also possible to bridge multiple costs inside the same indicator context (i.e. Broad Context Detection).

Another improvement according to an embodiment is that new IOCs can be generated on the fly based on actions of a process that is under monitoring. As a practical example, conventional process monitoring solutions enable monitoring a registry launchpoint that have been analysed to be malicious. However, this will not give an indication about which registry launchpoint should be monitored. Clean processes generate many unique registry launchpoints and the embodiments of the invention enable automatically analysing which of them is a new IOC and requires tracking. Thus, the invention enables finding yet unknown IOC by behavioural monitoring and starting tracking it.

Next example cases are described according to embodiments of the invention.

An attacker gets in to a computer system and does something that causes a security app/server to start tracking the process tree. The attacker next connects to a C&C and this is tracked by the security app/server and the C&C IP and domain is added to an IOC list. The attacker sets registry persistence using a unique registry key. The security server identifies the registry key and adds it to the IOC.

After the computer is rebooted, the persistence of the attacker is started. The security server identifies that the process that the attacker started matches the earlier generated IOC. Thus, the security server is able to keep tracking the attacker within the scope of the same indicator/broad context detection.

In case the attacker compromises another computer system, the payload connects to C&C that matches the earlier generated IOC. The security server is able to identify the C&C by IOC and keep tracking the attacker within the same indicator.

The embodiments of the invention enable keeping track of an attacker after reboot or other event that causes us to lose the process GPID chain.

Here is another practical example:

An attacker gets access to some computer system that he wants to persist in. He sets up a custom persistence on:

```
msf exploit(persistence) > exploit -j
[*] Exploit running as background job.
[*] Running persistent module against FILESERVER via session ID: 3
[+] Persistent VBS script written on FILESERVER to
C:\Windows\TEMP\RDcdkNPK.vbs
[*] Installing as HKLM\Software\Microsoft\Windows\
CurrentVersion\Run\jllaJxZj
[+] Installed autorun on FILESERVER as HKLM\Software\
Microsoft\Windows\currentVersion\Run\jllaJxZj
```

The security server detects the persistence based on a rule that monitors launchpoint activity done by an already detected process. For example, detecting just setting a launchpoint would be too false alarm prone.

RDS marks this _unique_ launchpoint event, execution of C:\Windows\TEMP\RDcdkNPK.vbs as an IOC.

When the computer reboots, it is now possible to A: detect the attacker as soon as his persistence component starts, and B: relate the information to an existing incident indicator. Thus, the security server is able to detect when the computer happens to reboot and immediately track the indicator and tie it up with existing indicator data.

In an embodiment, it is first detected that a process sets a persistence or something else that can be used as a trigger for generating a new IOC. An analysis is made related to this detection to evaluate/determine the nature of the event this persistence would cause when activated.

For example, in an example case an attacker sets a run key (to a registry):

\\REGISTRY\\USER\\S-1-5-21-250783004-3895570928-2943789387-1105\\Software\\Microsoft\\Windows\\CurrentVersion\\Run where the registry key is: "iulpsllnb" and having data: "C:\\Users\\frank\\AppData\\Local\\Temp\\PwGIApHjywM.vbs".

Just monitoring the setting operation of this registry key as an IOC would be useless since the attacker always uses random names and thus, conventional techniques using static IOC strings would not work.

Instead, in an embodiment of the invention, an IOC may be generated that will monitor the launching of: C:\\Users\\frank\\AppData\\Local\\Temp\\PwGIApHjywM.vbs.

Thus, after the reboot of the computer, the attacker can be tracked immediately and information about which indicator the related launch of C:\\Users\\frank\\AppData\\Local\\Temp\\PwGIApHjywM.vbs was related to is known.

When compared to false alarm prone methods that identify incidents just based on time or a computer name, the embodiments of the invention enable tracking attackers over multiple reboots by generating IOC information on the fly and thus reducing false alarms to minimum.

As described above, the nature of the model used by the system (e.g. EDR) may be, or may incorporate elements, from one or more of the following: a neural network trained using a training data set, exact or heuristic rules (e.g. hardcoded logic), fuzzy logic based modelling, and statistical inference based modelling. The model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of threat control in a computer network security system, the method comprising:
    monitoring, by a server in the computer network security system, events collected from a plurality of network nodes, wherein the events are collected data blocks;
    detecting, by the server, a first suspicious event among the monitored events by a detection mechanism;
    monitoring, by the server, the behavior of the first suspicious event and any related events, wherein the monitoring comprises monitoring a behavior of a computer process and any child processes thereof;
    in case the monitored first suspicious event and/or a related event is detected, by the server, to perform an activity triggering an IOC (indicator of compromise), generating a new IOC, wherein the activity comprises creating a registry launch point, the new IOC derived at least in part from said registry launch point, creating a file in an unusual location, creating a file with an unusual name, communication to an unknown Internet Protocol (IP) address, communication to an unknown IP domain, and the generating of the new IOC comprises synthesizing, by the server, the new IOC on the basis of the behavior of the computer process and any child processes of the detected first suspicious event and the related event;
    monitoring, by the server, new events when the activity ends;
    comparing, by the server, the behavior of the new events with the behavior of the generated IOC;
    in case a matching behavior is found, merging, by the server, the new event with the first suspicious event and/or related events related to the generated IOC; and
    generating, by the server, a security related decision on the basis of the IOC.

2. The method according to claim 1, wherein the detection mechanisms used to detect the suspicious event comprises using at least one of: a machine learning models, a scanning engine, a heuristic rule, a statistical anomaly detection, fuzzy logic based models, predetermined rules.

3. The method according to claim 1, wherein the monitoring of new events takes place after reboot of a computer system related to the network node that is being monitored or after other event inducing breaking of a process group identifier chain related to the first suspicious event that is being monitored.

4. The method according to claim 1, wherein in case the generated security related decision determines that signs of a security breach have been detected, taking further action to secure the computer network and/or any related network node, wherein the further action comprises one or more of the list of:
    preventing one or more of the network nodes from being switched off;
    switching on a firewall at one or more of the network nodes;
    warning a user of one or more of the network nodes that signs of a security breach have been detected; and/or
    sending a software update to one or more of the network nodes.

5. A server comprising a non-transitory memory storing computer program code, and one or more processors for executing the code for performing:
    monitoring, by the server, events collected from a plurality of network nodes, wherein the events are collected data blocks;
    detecting, by the server, a first suspicious event among the monitored events by a detection mechanism;
    monitoring, by the server, the behavior of the first suspicious event and any related events wherein the monitoring comprises monitoring a behavior of a computer process and any child process thereof;
    in case the monitored first suspicious event and/or a related event is detected, by the server, performing an activity triggering an IOC (indicator of compromise), generate a new IOC;
    monitoring, by the server, new events when the activity ends;
    comparing, by the server, the behavior of the new events with the behavior of the generated IOC, wherein the activity comprises creating a registry launch point, the new IOC derived at least in part from said registry launch point, creating a file in an unusual location, creating a file with an unusual name, communication to an unknown Internet Protocol (IP) address, communication to an unknown IP domain, and the generating of the new IOC comprises synthesizing, by the server, the new IOC on the basis of the behavior of the computer process and any child processes of the detected first suspicious event and the related event;

in case a matching behavior is found, merge, by the server, the new event with the first suspicious event and/or related events related to the generated IOC; and generate, by the server, a security related decision on the basis of the IOC.

6. The server according to claim 5, wherein the detection mechanisms used to detect the suspicious event comprises using at least one of: a machine learning models, a scanning engine, a heuristic rule, a statistical anomaly detection, fuzzy logic based models, predetermined rules.

7. The server according to claim 5, wherein the monitoring of new events takes place after reboot of a computer system related to the network node that is being monitored or after other event inducing breaking of a process group identifier chain related to the first suspicious event that is being monitored.

8. The server according to claim 5, wherein in case the generated security related decision determines that signs of a security breach have been detected, the processor is configured to take further action to secure the computer network and/or any related network node, wherein the further action comprises one or more of the list of:

preventing one or more of the network nodes from being switched off;

switching on a firewall at one or more of the network nodes;

warning a user of one or more of the network nodes that signs of a security breach have been detected; and/or sending a software update to one or more of the network nodes.

9. A non-transitory computer storage medium having stored thereon computer program code for threat control in a computer network security system, the program code being configured to cause:

monitoring, by a server in the computer network security system, events collected from a plurality of network nodes, wherein the events are collected data blocks;

detecting, by the server, a first suspicious event among the monitored events by a detection mechanism;

monitoring, by the server, the behavior of the first suspicious event and any related events, wherein the monitoring comprises monitoring a behavior of a computer process and any child processes thereof;

in case the monitored first suspicious event and/or a related event is detected, by the server, to perform an activity triggering an IOC (indicator of compromise), generating a new IOC, wherein the activity comprises creating a registry launch point, the new IOC derived at least in part from said registry launch point, creating a file in an unusual location, creating a file with an unusual name, communication to an unknown Internet Protocol (IP) address, communication to an unknown IP domain, and the generating of the new IOC comprises synthesizing, by the server, the new IOC on the basis of the behavior of the computer process and any child processes of the detected first suspicious event and the related event;

monitoring, by the server, new events when the activity ends;

comparing, by the server, the behavior of the new events with the behavior of the generated IOC;

in case a matching behavior is found, merging, by the server, the new event with the first suspicious event and/or related events related to the generated IOC; and generating, by the server, a security related decision on the basis of the IOC.

* * * * *